United States Patent [19]

Baechle

[11] 3,828,484
[45] Aug. 13, 1974

[54] POWER TOOL ACCESSORY
[76] Inventor: Charles H. Baechle, 7701 Telegraph Rd., St. Louis, Mo. 63129
[22] Filed: Aug. 28, 1972
[21] Appl. No.: 284,054

[52] U.S. Cl.............. 51/170 EB, 51/241 G, 145/20, 248/2
[51] Int. Cl....................... B24b 23/06, B24b 23/08
[58] Field of Search........ 51/170 R, 170 EB, 170 T, 51/170 PT, 241 G, 241 S, 277; 90/DIG. 3; 144/134 D, 136 C; 145/4, 4.1, 4.2, 6.7, 20, 129; 248/2, 16, 23; 269/1

[56] References Cited
UNITED STATES PATENTS
| | | | |
|---|---|---|---|
| 1,057,582 | 4/1913 | Schade | 145/20 |
| 2,871,897 | 2/1959 | Hesse | 145/4 |
| 2,997,081 | 8/1961 | Christophersen | 145/4 X |
| 3,288,183 | 11/1966 | Eisbrenner | 144/136 C |

Primary Examiner—Donald G. Kelly
Assistant Examiner—Mark S. Bicks
Attorney, Agent, or Firm—Ralph W. Kalish

[57] ABSTRACT

An accessory for a portable power tool, such as a sander, for supporting same with relationship to the work for presentation in preselected attitude thereto, said accessory comprising a main component positionable upon a major surface of the work, and being adjustable to accommodate the angle formed by such surface with the adjacent edge to be treated, and an adapter fixed to the tool and selectedly engageable to said main component to locate said tool for effective operation upon the work edge.

5 Claims, 7 Drawing Figures

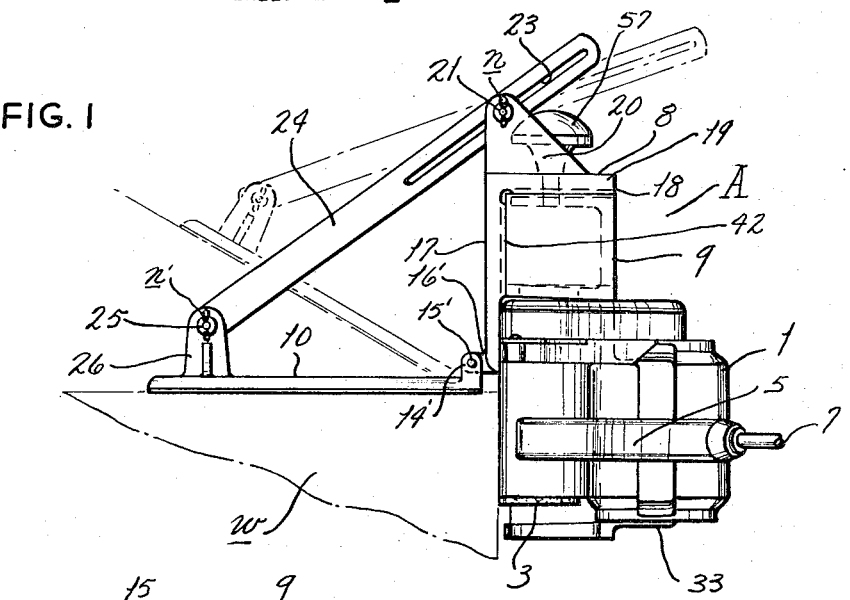
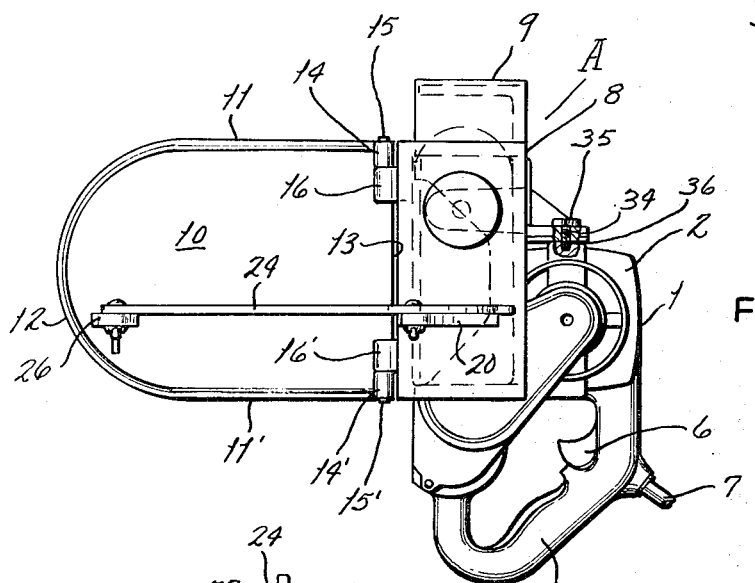
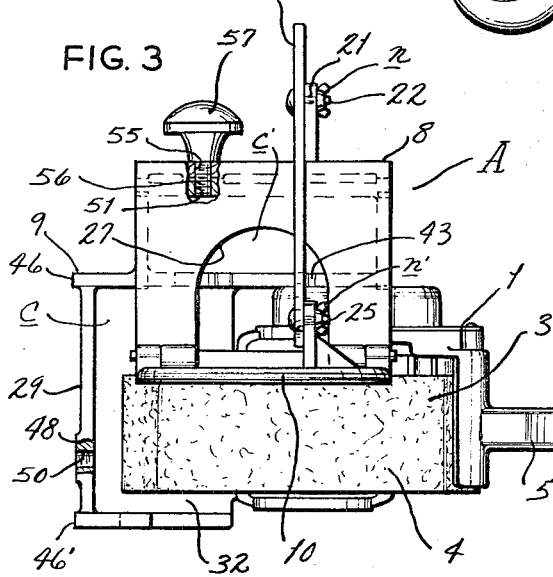
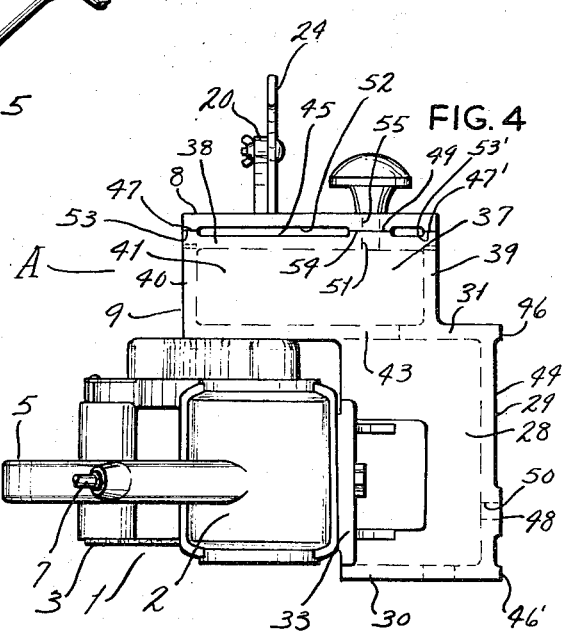

3,828,484

POWER TOOL ACCESSORY

BACKGROUND AND SUMMARY OF THE INVENTION

This invention relates to portable power-operated tools and, more particularly, to an accessory for use therewith; being of the general type shown in my U.S. Pat. No. 3,664,614 granted May 23, 1972.

It is an object of the present invention to provide an accessory for a power tool which is adapted for securement to said tool so as to constitute therewith an integrated, manipulable, unitary device.

It is another object of the present invention to provide an accessory for a power tool of the type stated which embodies means for easily accommodating work pieces wherein the angle formed by the planes of the major surfaces and of the side surfaces of such work pieces may vary substantially.

It is another object of the present invention to provide an accessory for a power tool of the type stated having means for readily presenting a tool, such as a sander, to the surface to be worked so that the operating portion of the tool may be easily located with its major axis either widthwise or lengthwise of such surface.

It is a still further object of the present invention to provide a power tool accessory of the character stated which comprises a marked simplicity of components, with the same being of sturdy construction and adapted for facile interconnection in positions of use so that the operation of such accessory is rendered relatively simple for the average user.

It is a still further object of the present invention to provide an accessory of the type stated which is so constructed as to be stable in position of use upon the particular work, obviating any likelihood of accidental displacement thereby assuring of reliability of the operation of the tool for the particular intended purpose.

It is another object of the present invention to provide a power tool accessory of the character indicated which eliminates concern on the part of the user as to the efficacy of the associated tool in operation, thereby avoiding the customary imperfections heretofore accepted in the use of hand power tools; and which accessory may be economically produced.

BRIEF DESCRIPTION OF THE DRAWINGS

FIG. 1 is a side elevational view of the power tool accessory constructed in accordance with and embodying the present invention illustrating the same engaged to a sander with the latter presented in horizontal position.

FIG. 2 is a top plan view.

FIG. 3 is a front elevational view taken from the left hand side of FIG. 1.

FIG. 4 is a rear elevational view taken from the right hand side of FIG. 1.

DESCRIPTION OF THE PREFERRED EMBODIMENT

Figure 5:
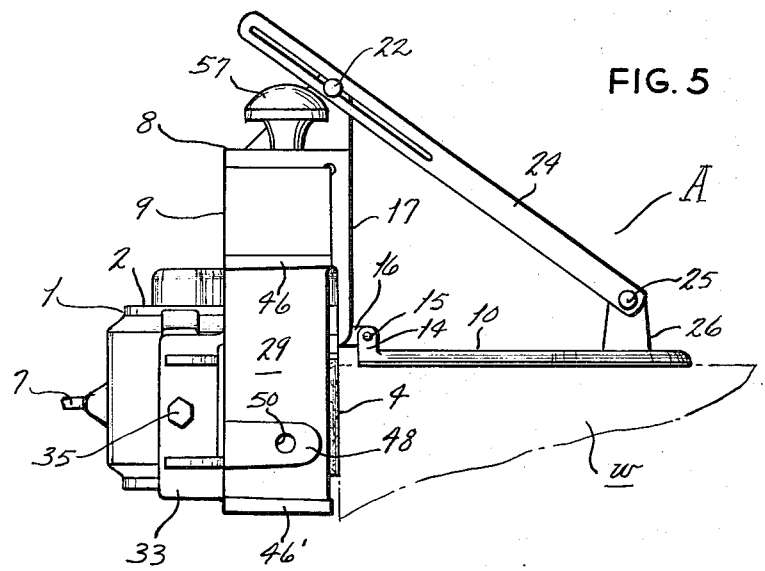
FIG. 5 is a side elevational view taken from the opposite side of that depicted in FIG. 1.

Referring now by reference characters to the drawings which illustrate the preferred embodiment of the present invention, 1 generally designates a portable, power-operated sander, which sander is presented as exemplary of a power tool for utilization with the accessory, indicated broadly A, and to be described more fully hereinbelow. Power sander 1 is of conventional character having a customary housing 2 for accommodating a motor (not shown); together with the usual motion transmitting means incorporating a drive and driven rollers (not shown) for supporting an endless belt 3 having an abrasive surface of preselected coarseness. The working, or outer, course 4 of belt 3 is stabilized, in the conventional manner, as by a backing plate (not shown) appropriately supported within housing 2. Formed integrally with housing 2 in the expected manner is a handle or grip 5 having a control trigger 6 for effecting energization of the motor, which latter may be connected to a convenient source of power through a conductor, indicated at 7. The construction of sander 1 does not form a part of the present invention, but with its conventionality being exemplary of the usefulness of accessory A with power tools, in that the same is, as shown below, intended for facile use with regularly available tools.

Accessory A is broadly of two-part construction comprising a main component or tool positioner, indicated at 8, and an adapter 9 fixed to the particular tool and engageable in preselected attitudes upon said main component 8.

Said main component or tool positioner 8 comprises a flat plate 10 for disposition upon a major surface of the work, indicated w, to be operated upon by sander 1. Said plate 10 is provided with lateral margins 11,11', a free outer end margin 12 which, if desired, may be arcuated, and an inner end margin 13 perpendicular to side margins 11,11'. Formed integral with the upper surface of plate 10, adjacent opposite ends of inner margin 13 are knuckles 14,14' for receiving hinge pins 15,15', respectively, which latter are accepted within cooperating knuckles 16,16' provided spacedly on the lower end portion of a normally vertical wall 17 of a generally inverted L-shaped support 18, and which embodies a top wall 19 planarwise normal to wall 17 at its upper end and projecting therefrom away from plate 10. Projecting upwardly from the upper surface of top wall 19 is a unitary boss 20 being apertured at its upper end, as at 21, for extension therethrough of a bolt 22 which projects through an elongated slot-like opening 23 formed in the normally upper end portion of a control bar 24, which at its lower end is suitably connected, as by a bolt 25, to the upper end of a boss 26 upstanding from the forward end portion of the normally upper surface of plate 10. Said bolts 22,25 are each adapted to threadedly receive a wing nut $n,n'$, respectively, for maintaining said bar 24 in selected position. As may best be seen by the full lines and phantom lines of FIG. 1, bar 24 controls the attitude of plate 10 with respect to support 8 so that as bolt 22 is relatively moved along slot 23 toward the lower end of bar 24, the effective distance between bosses 20 and 26 will be shortened, thereby causing plate 10 to swing appropriately about its pivot axis defined by hinge pins 15,15'. The length of slot 23 will generally determine the swingability of plate 10 with respect to support 8.

In usage it will be seen that the under surface of plate 10 will be disposed upon the surface of work w immediately adjacent the edge to be treated by sander 1 (see FIG. 1). By the swingability of plate 10, the same is adapted to accommodate surfaces which are inclined to the particular reference axis, whether the same be horizontal or vertical. Although FIG. 1 reveals a work piece having a horizontal top surface, it is quite apparent that the same might easily be turned through an angle of 90° so that plate 10 would be presented against a vertical surface, if desired.

Figure 6:
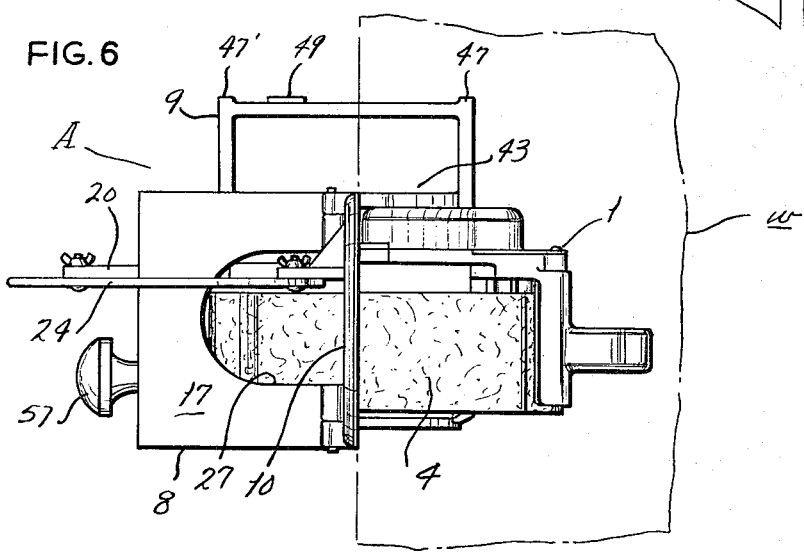
FIG. 6 is a front elevational view of the power tool accessory with the engaged sander having its major axis turned through an angle of 90° from that shown in FIG. 1 and with the accessory presented against a vertical work surface.

As shown in FIGS. 3 and 6, wall 17 may be cut away in its central lower portion, as at 27, for both weight reduction purposes, as well as to permit of ready visual inspection of the associated tool.

Adapter 9 is a unitary casting, of the general nature of a casing, having a main chamber c for receiving sander 1, which chamber is provided with a partial rear wall 28, an end wall 29 and parallel side walls 30,31, said latter being of greater extent than the former. Said chamber c is open forwardly of opposite rear wall 28, as at 32, to permit of appropriate exposure of belt 3 of the sander 1. Projecting rearwardly from rear wall 28 in planarwise perpendicular relationship thereto and along its edge remote from wall 29, is a mounting flange 33 centrally apertured, as at 34, for extension therethrough of a bolt 35 which is engaged within a tapped opening 36 formed in the housing 2 of sander 1 so as to firmly engage said tool to said adapter 9. The relatively reduced extent of rearward wall 28, the depth of end and side walls 29, 30 and 31, and the openness of chamber c forwardly, permit of reception of sander 1 so that belt 3 will be appropriately presented for operation and with grip 5 being readily accessible for manipulation purposes. Adapter 9 also bodily incorporates a lateral extension 37 having an outer wall 38 planarwise parallel to side wall 31 but being of relatively reduced extent with respect thereto, but, for purposes presently appearing, is of like extent as wall 29. Connecting outer wall 38 to side wall 31 are parallel end walls 39,40 which are planarwise parallel to end wall 29, there being a rearward wall portion 41 which is continuous with rear wall 28 and with said extension 37 being opened forwardly, as at 42. It will thus be seen that extension 37 internally defines a compartment c' which communicates with chamber c through opening 43 provided in wall 31.

The outer surfaces of end wall 29 and outer wall 38 are of like character in that the same are recessed, as at 44,45, respectively, to present relatively raised end margins, as at 46,46', and 47,47', respectively. Each of said walls is provided with a transversely extending boss 48,49, respectively, which is proximate to, and is the same distance from, the respective end margin 46',47'. Each boss 48,49 in its forward portion is provided with a tapped opening 50, 51, respectively, for purposes presently appearing.

The undersurface of top wall 19 of support 18 is treated in complementary manner to end wall 29 and outer wall 38 of adapter 9 which appropriately mates therewith whereby on its undersurface top wall 19 is recessed, as at 52, to present downwardly projecting end margins 53,53' of like extent as the end margins of said end wall 29 and outer wall 38 of adapter 9. Said top wall is also provided with a boss 54 of like character as bosses 48,49 for appropriate mating therewith and with said boss 54 having a tapped opening 55 for registration with openings 50,51 when the particular end wall 29 or outer wall 38 is appropriately presented.

From the foregoing it will thus be apparent that adapter 9 is designed to be addressed to support 8 so that either outer wall 38 is in confronting relationship to the undersurface of top plate 19, or the outer surface of end wall 29 is presented thereto. As may best be seen in FIG. 4, the configurations of the paired walls permit of ready and simple abutment since the areas of contact are manifestly limited to the end margins and the engaged bosses so that the possibility of normally expected surface irregularities interferring with appropriate abutment is obviated.

Provided for securing adapter 9 to support 8 in the particular selected manner is a screw 56 engageable within the aligned tapped openings 55,50 or 55,51, as the case may be, and with such screw carrying an enlarged knob like head 57 for facilitating hand manipulation of the screw, as well as presenting a grip for promoting easy handling of accessory A in tool engaged or tool disengaged position.

Figure 7:
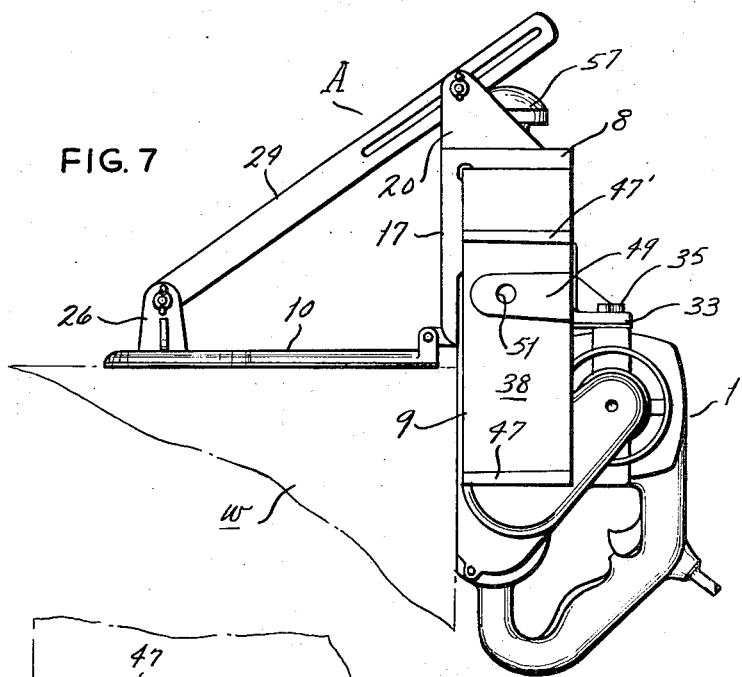
FIG. 7 is a side elevational view illustrating the engaged sander in the same relation as in FIG. 6 but with the accessory presented upon a horizontal work surface.

As shown in FIG. 4, with outer wall 38 abutting the undersurface of top wall 19 of support 8, and with screw 56 appropriately engaged, the major axis of belt 3 of sander 1 is presented transversely with relationship to wall 17 of support 8 or extending transversely of base plate 10. Referring to FIGS. 6 and 7, with end wall 29 being maintained in registering relationship with the undersurface of top wall 19, the major axis of belt 3 extends lengthwise of front wall 17. It will thus be seen that by simple adjusting of adapter 9, sander 1 may be presented in either of two positions, 90° apart, with respect to support 8 so that the belt 3 may be presented in a most effective manner for acting upon the particular edge to be sanded. The swingability of base plate 10 will automatically cause the engaged sander 1 to be presented to work surfaces which are commensurately inclined to the vertical or horizontal, as the case may be. The extreme versatility of the present invention is indicated in FIG. 6 wherein base plate 10 is presented against a vertical surface to allow for corresponding presentation of the belt 3 to the particular edge to be treated and, manifestly, accessory A together with the engaged sander 1 may be as easily used in such manner to dispose the normally undersurfaces of base plate 10 against the under side of a work piece should such be desired.

From the foregoing, it will thus be seen that sander 1 is at all times fixedly secured to adapter 9 so that there is no need for continuing necessity to adjust same with relationship thereto. The user accordingly need merely dispose the adapter in either one of its two positions with respect to support 8 so that the belt 3 is presented in the desired manner. This adjustment is effected by mere loosening and corresponding tightening of screw 56.

Loosening of wing nut n will allow for movement of bar 24 so that plate 10 will appropriately rest against the work surface adjacent the edge to be treated.

Accessory A may be most economically produced, as by casting, and is of sturdy construction so as to be durable and reliable in usage.

It is to be understood that the versatile usefulness of accessory A is illustrated hereinabove with respect to a hand operated sander. It is to be understood that other portable power tools may be utilized with accessory A with equal facility.

Having described my invention, what I claim and desire to obtain by letters Patent 1. For use with a work-edge treating tool having a work-edge engaging portion, a work positioner comprising a plate having an upper surface and a lower surface for flatwise disposition upon the surface of the work adjacent the edge to be treated, a casing-like support member having a vertical wall and a top wall planarwise perpendicular to said vertical wall, said vertical wall having an outer side disposed toward said plate and inner side directed away from said plate, said top wall having an under-face and being located on the inner side of said vertical wall, means pivotally connecting said vertical wall in its outer side lower portion to the work-edge adjacent portion of said plate whereby said latter is relatively swingable between lowered, substantially planarwise perpendicular relationship to said vertical wall on its outer side and upper, substantially planarwise parallel relationship to said vertical wall, adjustable means interconnecting said top wall and said plate for controlling the disposition of said vertical wall to said plate between said upper and lower positions to accommodate the tool to the edge to be treated, and a housing-like adapter received within said support member at the inner side of said vertical wall and having first and second surface portions in normal planar relationship, each of said first and second surface portions being dimensioned for optional mating disposition against the under surface of said top wall, means for detachably securing the selected of said first and second surface portions to said top wall, and means fixedly securing said tool to said adapter for exposing said tool below the pivotal connection between the vertical wall and said plate, whereby the attitude of said tool to the edge to be treated is altered dependent upon which of said first and second surface portions is engaged to said top wall.

2. A work positioner as defined in claim 1 and further characterized by said adjustable means comprising a bar, means engaging one end of said bar to the upper face of said plate, a boss projecting upwardly from the top wall of said support member, said bar having a slot-like opening in its end portion remote from said plate, and means engaging the slotted end portion of said bar to said boss at a predetermined point therealong for maintaining said plate in predetermined swung relationship with respect to said vertical wall.

3. A work positioner as defined in claim 1 and further characterized by said means for detachably securing said first and second surface portions to said top wall comprising a threaded fastener, said adapter first and second surface portions and said support member top wall having registering openings when mated, and said fastener engagable within said registered openings.

4. A work positioner as defined in claim 3 and further characterized by said threaded fastener having an enlarged knob-like head for extension beyond the top wall.

5. The combination with a power sander having an abrasive-coated belt for treating the edge of a work, of a work positioner comprising a plate for flatwise disposition upon the surface of the work adjacent the edge to be sanded, a casing-like support member having a vertical wall and a top wall planarwise perpendicular to said vertical wall, said vertical wall having an outer face confronting said plate and said top wall having an under-surface, means pivotally connecting said vertical wall in its lower edge portion to the work-edge adjacent portion of said plate establishing a pivot axis, whereby said latter is swingable between lowered, substantially planarwise perpendicular relationship to said vertical wall and upper, substantially planarwise perpendicular relationship to said vertical wall, adjustable means for connecting said top wall and said plate for controlling the angularity between the plane of the vertical wall and the plane of said plate between said upper and lower positions to accommodte the sander to the edge to be treated, and a housing-like adapter received within said support member and having first and second surface portions in planarwise perpendicular relationship, each of said first and second surface portions being dimensioned for optical mating disposition against the under-surface of said top wall, means for detachably securing the selected of said first and second surface portions to the said top wall, and means fixedly securing said sander to said adapter whereby with said first surface portion engaged to said top wall said belt will be substantially axially parallel to the established pivot axis, and with said second surface portion engaged to said top wall said belt will be substantially axially normal to said pivot axis.

* * * * *